(12) United States Patent
Watanabe

(10) Patent No.: US 7,628,171 B2
(45) Date of Patent: Dec. 8, 2009

(54) FLUID LEAK PREVENTING STRUCTURE

(75) Inventor: Daisuke Watanabe, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 554 days.

(21) Appl. No.: 11/409,662

(22) Filed: Apr. 24, 2006

(65) Prior Publication Data

US 2007/0065704 A1    Mar. 22, 2007

(30) Foreign Application Priority Data

Sep. 20, 2005    (JP) .............................. 2005-272512

(51) Int. Cl.
*F16L 37/28* (2006.01)
(52) U.S. Cl. .............................. 137/614.03; 137/614.04; 137/614; 251/149.1; 251/149.6
(58) Field of Classification Search .................. 137/614, 137/614.03–614.05; 251/149.1, 149.6
See application file for complete search history.

(56) References Cited

U.S. PATENT DOCUMENTS 7,059,582 B2 *   6/2006  Adams et al. ............. 251/149.6

FOREIGN PATENT DOCUMENTS

| JP | 2000-015826 | 1/2000 |
|---|---|---|
| JP | 2004-16500 | 6/2004 |

* cited by examiner

*Primary Examiner*—Kevin L Lee
(74) *Attorney, Agent, or Firm*—Blakely, Sokoloff, Taylor & Zafman LLP

(57) ABSTRACT

A leak preventing structure is provided with a first unit, a second unit and an absorbing member. The first unit includes a first casing, a convex portion, and a first passage which is open in an end of the convex portion. The second unit includes a second casing, a concave portion which includes an inner circumferential wall and a bottom wall and into which the convex portion is to be inserted, and a second passage which is open in the bottom wall of the concave portion and which is to be connected to the first passage. The absorbing member is provided on the inner circumferential wall of the concave portion, which is to be interposed between the inner circumferential wall of the concave portion and the outer circumferential surface of the convex portion and is configured to absorb a fluid.

14 Claims, 8 Drawing Sheets

FLUID LEAK PREVENTING STRUCTURE

CROSS-REFERENCE TO RELATED APPLICATIONS

This application is based upon and claims the benefit of priority from Japanese Patent Application No. 2005-272512, filed Sept. 20, 2005, the entire contents of which are incorporated herein by reference.

BACKGROUND

1. Field

One embodiment of the invention relates to a leak preventing structure for preventing a fluid leak, for example, to a leak preventing structure for preventing a leak from a connection section where a plurality of units are connected together.

2. Description of the Related Art

In recent years, a small-sized, high-output fuel cell device that does not have to be charged is attracting a great deal of attention as the power supply of a portable computer or that of another type of electronic apparatus. An example of such a fuel cell device is a direct methanol fuel cell (DMFC) which uses an aqueous solution of methanol as fuel.

A DMFC apparatus is provided with: a fuel cell main body having a power generating section; and a fuel cartridge removably attached to the fuel cell main body. The fuel cartridge is filled with high-concentration methanol, which is a fuel used for power generation. The fuel cartridge has a joint section. The joint section is connected to the fuel cell main body in such a manner that a liquid can be supplied to the fuel cell main body.

To use a new fuel cartridge, the old one is detached from the fuel cell main body. In this case, the fuel remaining in the joint section may leak out.

As a fuel leak preventing structure for use in a fuel cell apparatus, a fuel cell system having a fuel absorbing member for preventing a liquid fuel leak is proposed. This type of fuel cell system is described in Jpn. Pat. Appln. KOKAI Publication No. 2004-165000, for example. The fuel absorbing member described in this publication is in the form of a sheet and attached to a fuel tank in such a manner as to surround the fuel supply port of the fuel tank. With this structure, even if the fuel leaks out of the fuel supply port, the leaking fuel is absorbed in the fuel absorbing member.

As described above, the fuel absorbing member described in Jpn. Pat. Appln. KOKAI Publication No. 2004-165000 is located around the fuel supply port of the fuel tank. This means that the fuel absorbing member is located on the outermost side of the fuel cell system, which the user is likely to touch by mistake.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, a leak preventing structure is provided with a first unit, a second unit, and an absorbing member. The first unit includes a convex portion which is provided for a first casing and a first passage which is open in an end of the convex portion. The second unit includes a concave portion and a second passage. The concave portion is provided for a second casing and includes a inner circumferential wall and a bottom wall, and into which the convex portion is to be inserted. The second passage is open in the bottom wall of the concave portion, and is connected to the first passage and permits a fluid to flow between the first and second passages when the convex portion is inserted into the concave portion. The absorbing member is provided on the inner circumferential wall of the concave portion. The absorbing member is to be interposed between the inner circumferential wall of the concave portion and an outer circumferential surface of the convex portion, and is configured to absorb the fluid when the convex portion is pulled out of the concave portion.

An embodiment of the present invention will now be described with reference to the drawings. In the embodiment described below, the present invention is applied to a fuel cell apparatus.

Figure 1:
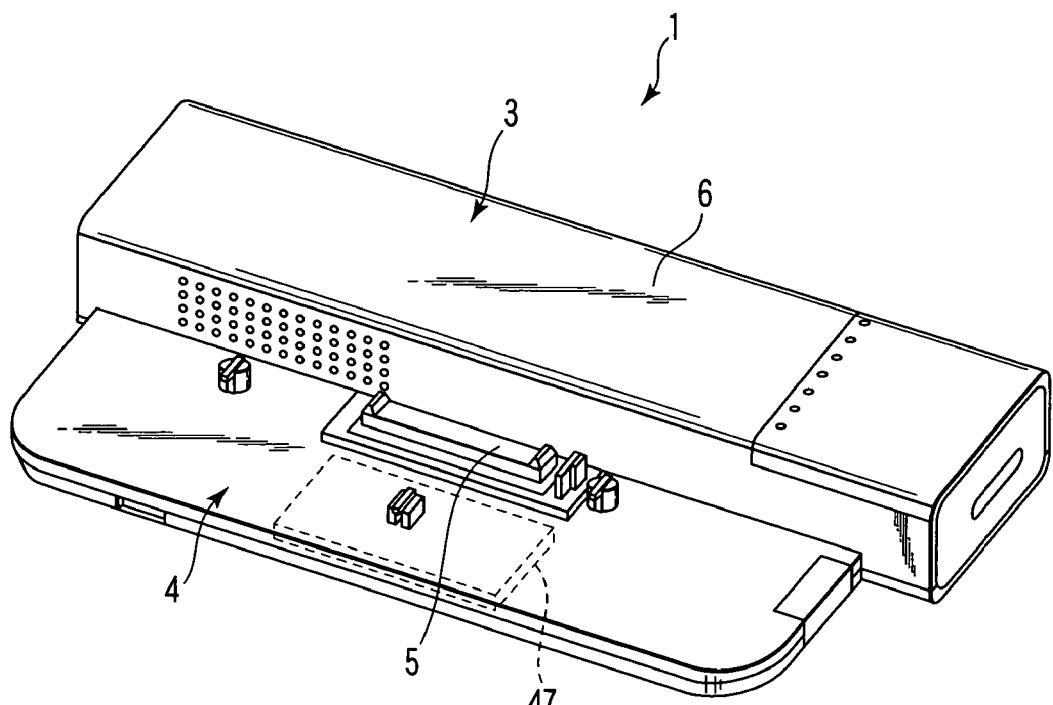
FIG. 1 is an exemplary perspective view of a DMFC apparatus according to the first embodiment of the present invention.
Figure 2:
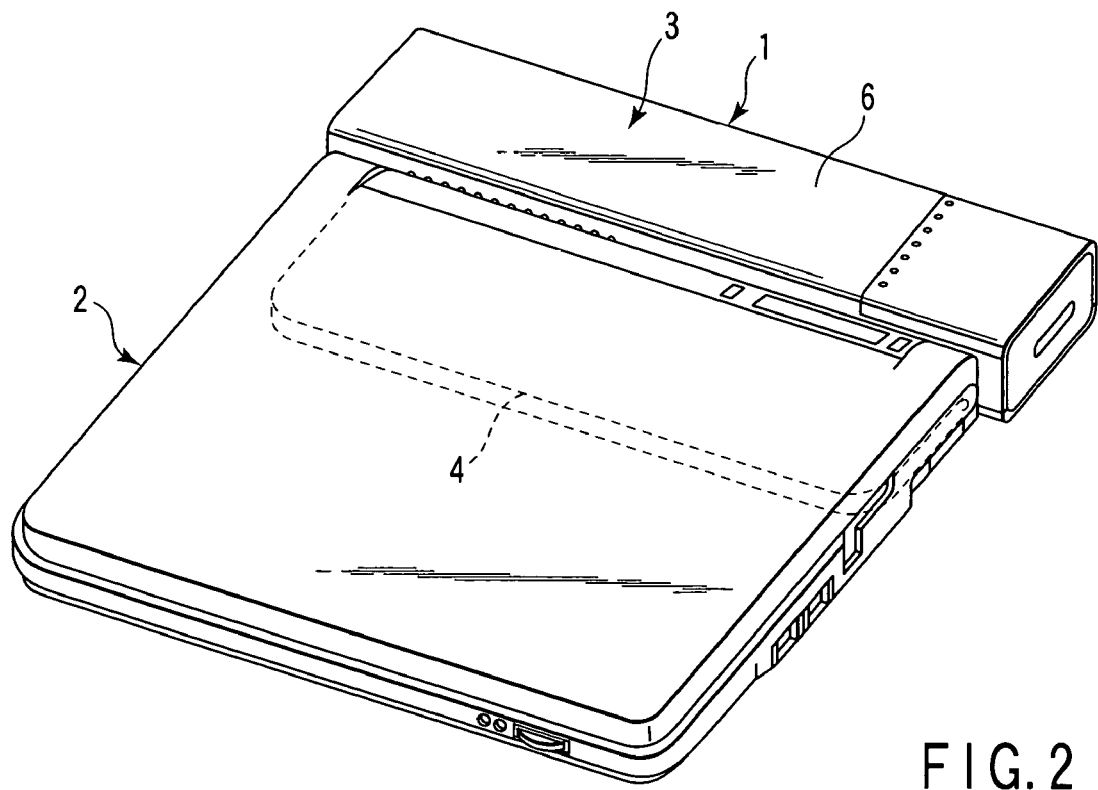
FIG. 2 is an exemplary perspective view showing how a personal computer is connected to the DMFC apparatus according to the first embodiment.

FIGS. 1 through 8 show a DMFC apparatus 1, which is one example of a leak preventing structure according to the first embodiment of the present invention. FIG. 1 shows the entire DMFC apparatus 1. As can be seen in FIG. 2, the DMFC apparatus 1 has a size suitable for use as the power supply of a portable computer.

As shown in FIG. 1, the DMFC apparatus 1 includes a main body 3 and a mount section 4. The main body 3 is elongated and extends in the longitudinal direction of the portable computer 2. The mount section 4 is horizontally projected from the front portion of the main body 3 in such a manner that the rear portion of the portable computer 2 can be mounted on the mount section 4. A power source connector 5 is located on the upper surface of the mount section 4. When the portable computer 2 is placed on the mount section 4, the power source connector 5 is electrically connected to the portable computer 2.

Figure 3:
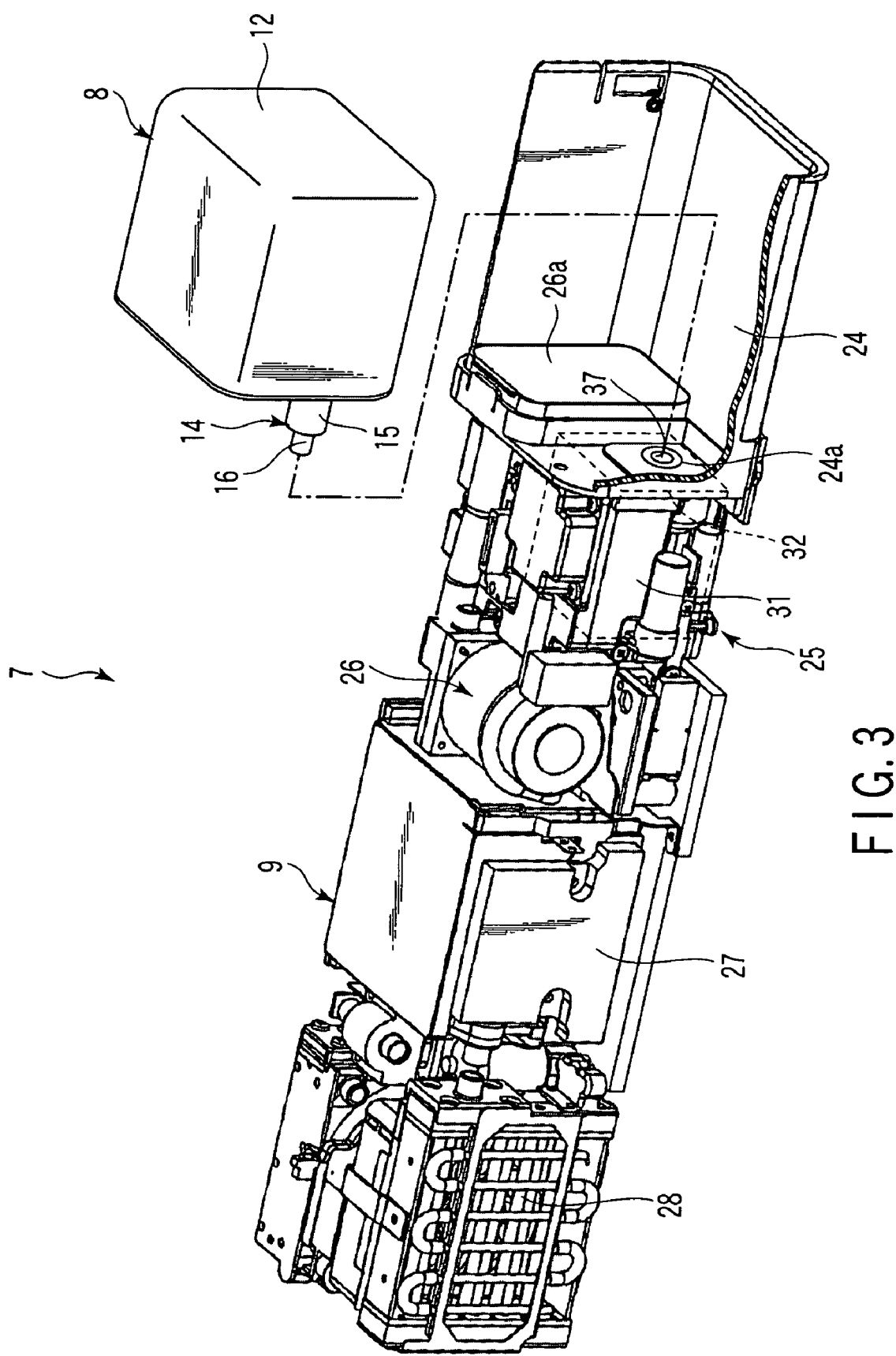
FIG. 3 is an exemplary perspective view of a DMFC unit employed in the first embodiment.

The main body 3 includes a box-shaped casing 6. The casing 6 contains a DMFC unit 7 inside. As shown in FIGS. 3 and 4, the DMFC unit 11 includes a fuel cartridge 8, a DMFC main body 9 and an absorbing member 10.

The fuel cartridge 8 is an example of a first unit. As schematically illustrated in FIG. 4, the fuel cartridge 8 includes a cartridge case 12, and an inner bag 13 housed inside the cartridge case 12.

Figure 8:
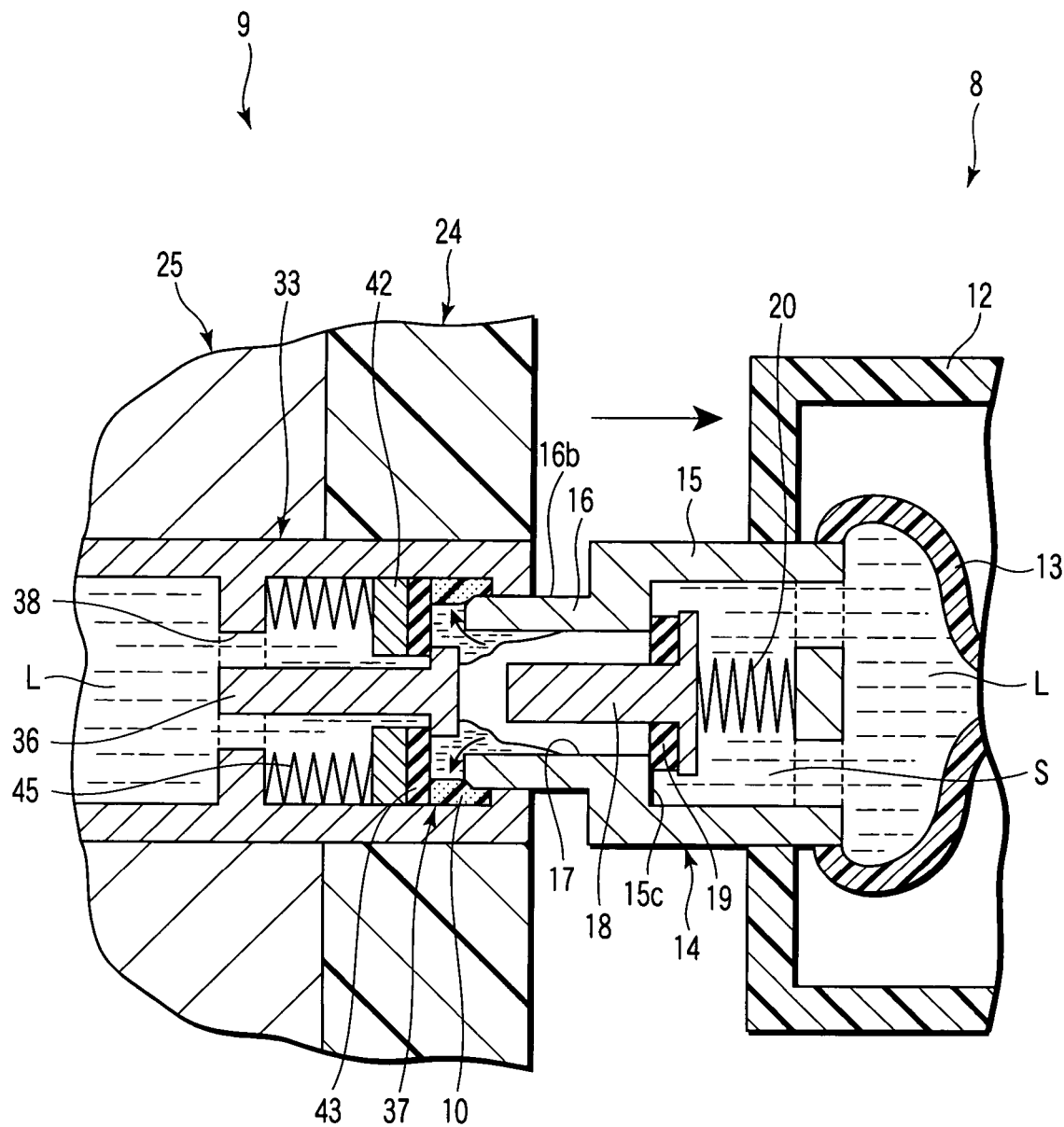
FIG. 8 is an exemplary sectional view showing how the convex and concave sections of FIG. 3 are when the convex section is being pulled out from the concave section.

The cartridge case 12 is an example of a first casing. The cartridge case 12 is like a hollow box. The inner bag 13 is filled with fuel L. An example of fuel L is high-concentration methanol. The fuel cartridge 8 supplies fuel L to the DMFC main body 9. As shown in FIG. 8, the inner bag 13 is made of an expansible or flexible substance and deflates in accordance with a decrease in the amount of fuel L contained.

Figure 4:
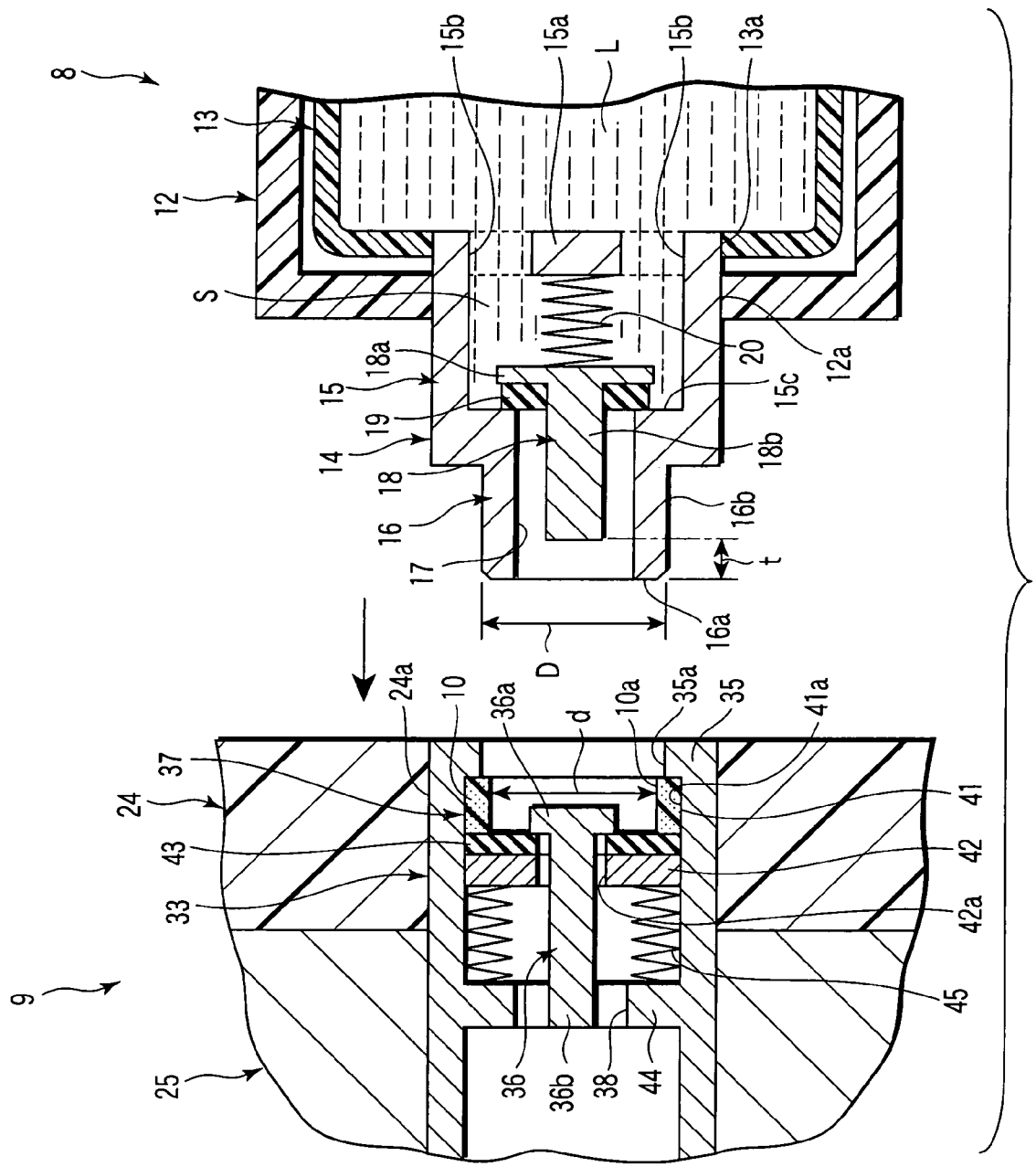
FIG. 4 is an exemplary sectional view showing how the convex and concave sections of FIG. 3 are before the convex section is inserted into the concave section.

As shown in FIG. 4, a liquid supply joint 14 is provided at one end of the cartridge case 12. The liquid supply joint 14 is an example of a first fluid supply portion. The cartridge case 12 has a first hole 12a at the position corresponding to the liquid supply joint 14. The first hole 12a communicates with the internal region of the cartridge case 12. The inner bag 13 has a second hole 13a at the position corresponding to the liquid supply joint 14. The second hole 13a communicates with the internal region of the inner bag 13.

The liquid supply joint 14 includes a cylindrical proximal portion 15 and a cylindrical convex portion 16. One end of the proximal portion 15 is projected out of the cartridge case 12. The other end of the proximal portion 15 extends through the first hole 12a into the internal region of the cartridge case 12 and is attached to that portion of the inner bag 13 that defines the second hole 13a. The other end of the proximal portion 15 includes a first spring support 15a.

The proximal portion 15 has a hollow space S inside. The proximal portion 15 has a plurality of third holes 15b permitting the hollow space S to communicate with the internal region of the inner bag 13. The proximal portion 15 has an inner wall 15c located at the boundary between the proximal portion 15 and the convex portion 16 and defining the hollow space S. The inner wall 15c has a wall surface portion opposed to the first spring support 15a.

As shown in FIG. 4, the convex portion 16 is projected from the tip end of the proximal portion 15 in the direction away from the cartridge case 12. The convex portion 16 has an outer diameter D smaller than that of the proximal portion 15. The projected end 17a of the convex portion D is chamfered. The convex portion 16 has a first liquid supply passage 17 inside. At one end, the first liquid supply passage 17 communicates with the outside of the fuel cartridge 8 in the projected end 16a of the convex portion 16. The other end of the first liquid supply passage 17 is open in the inner wall of the proximal portion 15 and communicates with the hollow space S.

The liquid supply joint 14 contains a first movable valve 18, a first seal member 19 and a first spring 20. These structural elements are located in the hollow space S of the proximal portion 15. The first movable valve 18 can be advanced or retracted in the direction in which the convex portion 16 is projected. The first movable valve 18 has a head portion 18a and a shaft portion 18b. The head portion 18a is shaped like a plate and has an outer diameter greater than the inner diameter of the first liquid supply passage 17.

As shown in FIG. 4, the shaft portion 18b is projected from the head portion 18a in the direction in which the convex portion 16 extends, and the tip end of the shaft portion 18b is located in the first liquid supply passage 17. The tip end of the shaft portion 18b is located in the liquid supply joint 14 and is away from the projected end 16a of the convex portion 16 by distance t. The first seal member 19 is provided on the surface of the head portion 18a from which the shaft portion 18b extends, and is shifted from the shaft portion 18b.

The first spring 20 is located between the first movable valve 18 and the first spring support 15a. One end of the first spring 20 is connected to the first spring support 15a, while the other end of the first spring 20 urges the first movable valve 18 in the direction in which the convex portion 16 is projected. When no external force is applied, the head portion 18a of the first movable valve 18 is in contact with the inner wall 15c, with the first seal member 19 interposed. In other words, the first seal member 19 provides a seal between the first liquid supply passage 17 and the hollow space S. In this state, the first liquid supply passage 17 is closed by the first movable valve 18.

The DMFC main body 9 is an example of a second unit and is also an example of a circulation device. As shown in FIG. 3, the DMFC main body 9 includes a holder 24, a mixing section 25, an air intake section 26, a DMFC stack 27 and a cooling section 28.

The holder 24 is at one longitudinal end of the DMFC main body 9. A fuel cartridge 8 is removably attached to the holder 24. The holder 24 has a hole 24a which is open to the outside of the DMFC main body 9.

As shown in FIG. 3, the mixing section 25 includes a mixing tank 31 and a mixing tub 32. The mixing tank 31 is an example of a second casing. The mixing tub 32 is inside the mixing tank 31. A fuel supply tube 33 is located at one end of the mixing tank 31. One end of the fuel supply tube 33 is exposed to the outside of the DMFC main body 9 through the hole 24a of the holder 24. The other end of the fuel supply pipe 33 is connected to the mixing tub 32.

The fuel supply tube 33 is an example of a second fluid supply portion. As shown in FIG. 4, the fuel supply tube 33 includes a bent portion 35, a fixing valve 36, a concave portion 37 and a second liquid supply passage 38.

The bent portion 35 is formed by bending the distal end portion of the fuel supply tube 33 inward. In other words, the bent portion 35 is at an end of the concave portion 37 and is directed toward the inward region of the concave portion 37. The distal end of the bent portion 35 defines an opening 35a which is open to the outside of the DMFC main body 9. The opening 35a has an inner diameter substantially equal to, or slightly greater than diameter D.

The fixing valve 36 includes a head portion 36a and a shaft portion 36b. The shaft portion 36b is coaxial with the fuel supply tube 33 and extends in the longitudinal direction of the fuel supply tube 33. The shaft portion 36b is fixed to the wall surface of the fuel supply tube 33. The head portion 36b is located at that end of the shaft 36b which is closer to the opening 35a. The head portion 36a has a cylindrical shape larger than that of the shaft portion 36b. The head portion 36a has a thickness which is less than distance t.

The convex portion 16 of the fuel cartridge 8 is inserted into the concave portion 37. As shown in FIG. 4, the concave portion 37 includes an inner circumferential wall 41, a second movable valve 42 and a second seal member 43. The inner circumferential wall 41 is shaped like a cylinder extending along the outer shape of the fuel supply tube 33. The inner circumferential wall 41 defines an opening 41a. The second movable valve 42 is an example of the bottom wall of the concave portion 37. The second movable valve 42 is substantially annular. The outer diameter of the second movable valve 42 is substantially equal to the inner diameter of the inner circumferential wall 41. The inner diameter of the second movable valve 42 is larger than the outer diameter of the shaft portion 36b of the fixing valve 36, and is smaller than the outer diameter of the head portion 36a.

The second movable valve 42 is movable in the longitudinal direction of the fuel supply tube 3. The second movable valve 42 is located more inward of the DMFC main body 9 than the head portion 36a of the fixing valve 36 is. The second movable valve 42 is stopped by the head portion 36a of the fixing valve 36 and is thus prevented from moving further toward the opening 35a.

The second seal member 43 is provided on that surface of the second movable valve 42 which is opposed to the opening 35a. The second seal member 43 is provided on the entire surface of the second movable valve 42. The first and second seal members 19 and 43 are formed of, for example, a resin material, such as rubber. When the convex portion 16 of the fuel cartridge 8 is inserted into the concave portion 37, the second seal member 43 is located between the projected end 16a of the convex portion 16 and the second movable valve 42.

As shown in FIG. 4, an absorbing member 10 is provided on the inner circumferential wall 41 at a position closer to the opening 35a than the second movable valve 42. The absorbing member 10 is located more inside of the DMFC main body 9 than the bent portion 35 is. The bent portion 35 covers part of the absorbing member 10 and does not expose that part to the outside of the DMFC main body 9.

Figure 5:
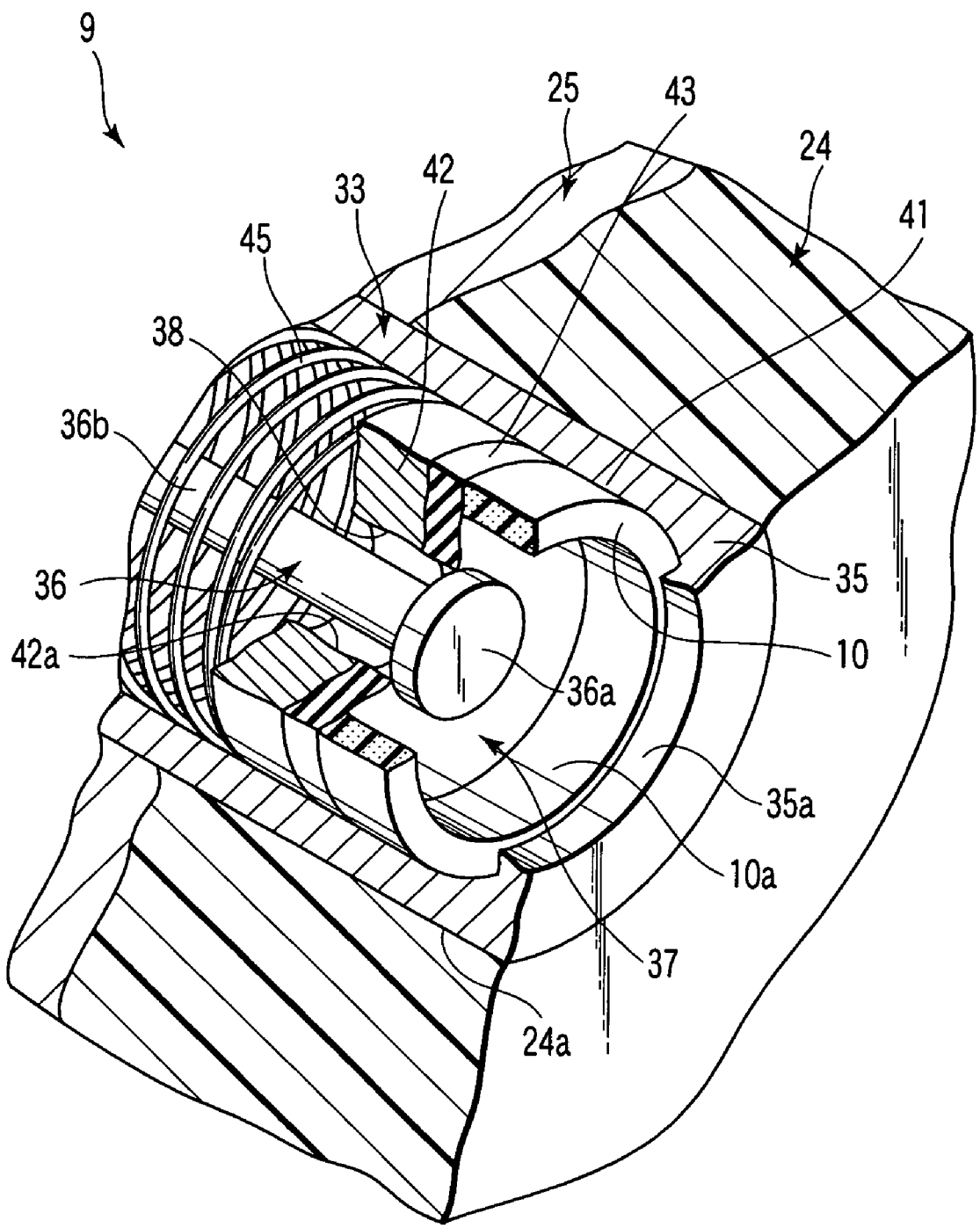
FIG. 5 is an exemplary partially-sectional perspective view of the convex section according to the first embodiment.

The absorbing member 10 is provided along the inner circumferential wall 41 and is thus substantially annular, as shown in FIG. 5. In other words, the absorbing member 10 has an opening 10a in the center. The outer diameter of the absorbing member 10 is substantially equal to that inner diameter of the inner circumferential wall 41. The inner diameter d of the absorbing member 10 is smaller than the outer diameter D of the convex portion 16. In other words, the opening 10a is smaller than the outer shape of the convex portion 16. The convex portion 16 is inserted into the opening 10a.

The absorbing member 10 is elastic and can absorb fuel L therein. For example, the absorbing member 10 is made of a material that permits absorbed fuel L to evaporate with time. For example, the absorbing member 10 is made of porous rubber, sponge or pasteboard.

The material of the absorbing member 10 is not limited to any specific type, as long as it can absorb fuel L. The absorbing member 10 does not necessarily permit the fuel L to evaporate; instead, it may be a member that absorbs fuel L by chemical reaction. The inner diameter d of the absorbing member 10 may be greater than the outer diameter D of the convex portion 16. Where this structure is adopted, the absorbing member 10 need not be an elastic member.

The absorbing member 10 may be fabricated as an annular member from the beginning. Alternatively, it may be in the form of a sheet, in which case it is attached to the inner circumferential wall 41 in such a manner as to form an annular member. Furthermore, the absorbing member 10 attached to the inner circumferential wall 41 need not be annular and may be one of a variety of shapes that conforms to the shape of the inner circumferential wall 41 of the fuel supply tube 33. The absorbing member 10 need not be entirely attached to the inner circumferential wall 41; it may be attached in part to the inner circumferential wall 41.

When the convex portion 16 is inserted into the concave portion 37, the absorbing member 10 is located between the inner circumferential wall 41 and the outer circumferential surface 16b of the convex portion 16.

As shown in FIG. 4, the second liquid supply passage 38 is located more inside of the DMFC main body 9 than the concave portion 37 is. One end of the second liquid supply passage 38 opens to the second movable valve 42. In other words, the second liquid supply passage 38 communicates with the space defined by the concave portion 37 through the region defined by the inner circumferential surface 42a of the second movable valve 42. When the convex portion 16 is inserted into the concave portion 37, the second liquid supply passage 38 is connected to the first liquid supply passage 17, so that the fuel L can flow to or from the first liquid supply passage 17. The other end of the second liquid supply passage 38 communicates with the mixing tub 32.

The fuel supply tube 33 further includes a second spring support 44 and a second spring 45. The second spring support 44 is located more inside of the DMFC main body 9 than the second movable valve 42 is and is fixed to the wall surface of the fuel supply tube 33. The second spring 45 is interposed between the second movable valve 42 and the second spring support 44.

One end of the second spring 45 is supported by the second spring support 44, while the other end of the second spring 45 urges the second movable valve 42 toward the opening 35a. When no external force is applied, the second movable valve 42 is in contact with the head portion 36a of the fixing valve 36, with the second seal member 43 interposed. In other words, the second seal member 43 provides a seal between the second liquid supply passage 38 and the opening 35a. With this structure, the second movable valve 42 closes the second liquid supply passage 38.

The mixing tub 32 dilutes the fuel L supplied from the fuel supply tube 33 and produces an aqueous solution of methanol having a concentration of several % to several dozen %. The mixing tub 32 supplies the produced aqueous solution of methanol to the DMFC stack 27.

As shown in FIG. 3, the air intake section 26 has an air intake port 26a which is open to the outside of the DMFC main body 9. The air intake section 26 takes in the outside air through the air intake port 26a and guides it into the DMFC main body 9. The air is then supplied to the DMFC stack 27.

The DMFC stack 27 is an example of a power generator section. In the DMFC stack 27, the aqueous solution of methanol and the oxygen in the air are made to react with each other, for power generation. Carbon dioxide and water vapor are generated as a result of the power generation. The carbon dioxide and the water vapor are supplied to the cooling section 28 along with unreacted methanol.

The cooling section 28 is at the other end of the DMFC main body 9. It cools the carbon dioxide and water vapor generated in the DMFC stack 27, and also cools the unreacted methanol. The cooled and liquefied water and methanol are supplied back to the mixing section 25 and used for producing an aqueous solution of methanol. The generated carbon dioxide is exhausted from the DMFC main body 9. As described above, the in the DMFC main body 9, the fuel L is circulated among the mixing section 25, the DMFC stack 27 and the cooling section 28.

As shown in FIG. 1, the mount section 4 contains a control section 47. The control section 47 monitors the states of the mixing section 25, air intake section 26 and DMFC stack 27 and cooling section 28 and controls the operations of these units 24, 25, 26 and 27. In addition to this, the control section 47 supplies the power generated by the DMFC stack 27 to the power source connector 5.

A description will now be given of the operation of the DMFC apparatus 1.

To supply the fuel L to the DMFC main body 9, the fuel cartridge 8 is attached to the holder 24, and the liquid supply joint 14 is connected to the fuel supply tube 33 of the DMFC main body 9.

The process of connecting the liquid supply joint 14 to the fuel supply tube 33 includes two stages, namely a first stage and a second stage.

Figure 6:
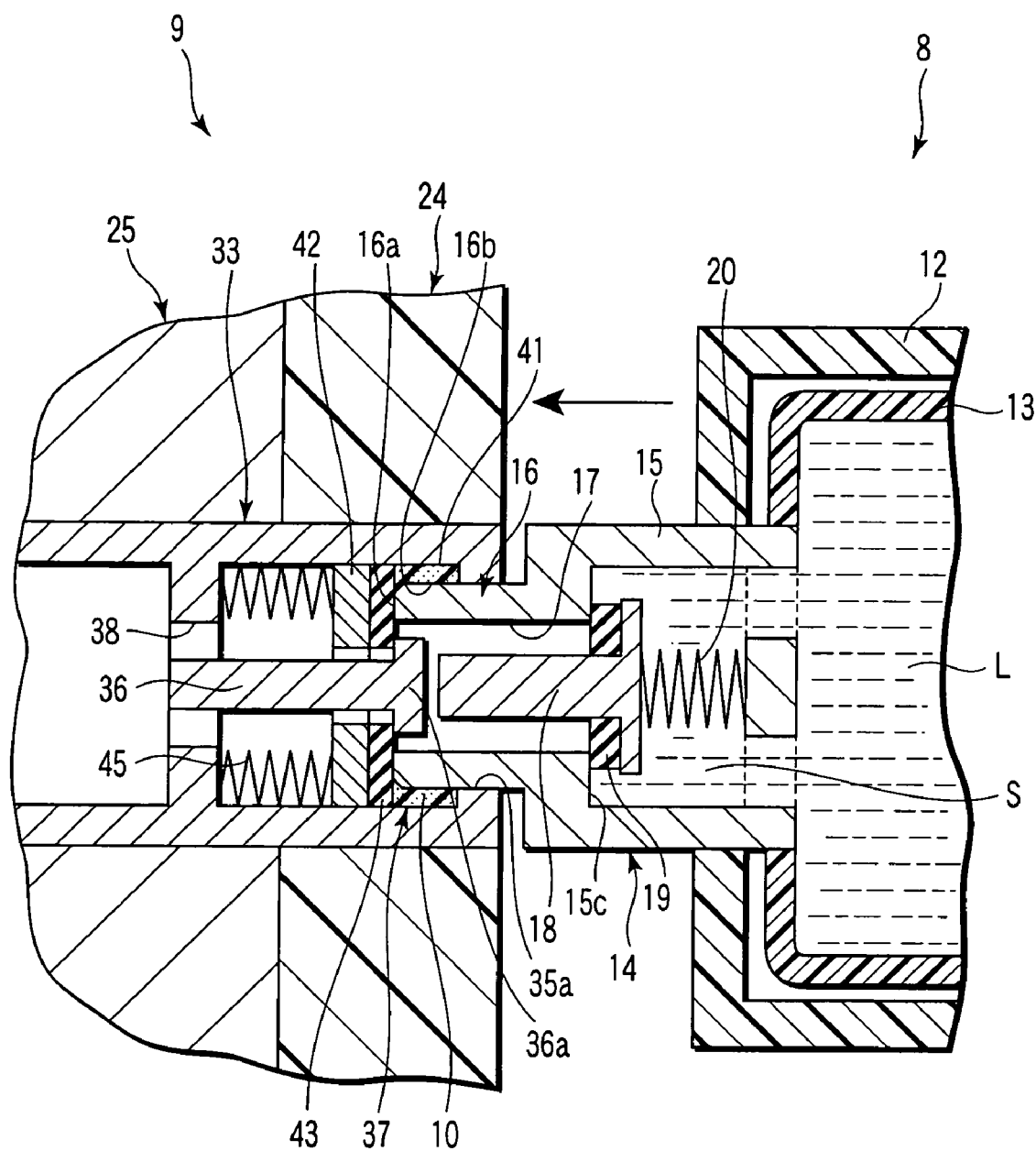
FIG. 6 is an exemplary sectional view showing how the convex and concave sections of FIG. 3 are when the convex section is being inserted into the concave section.

In the first stage, the convex portion 16 of the liquid supply joint 14 is inserted into the concave portion 37 of the fuel supply tube 33, as shown in FIG. 6. To be more specific, the projected end 16a of the convex portion 16 is inserted into the opening 35a of the fuel supply tube 33. The projected end 16a of the convex portion 16 is inserted further into the opening 10a of the absorbing member 10. The inner diameter d of the opening 10a is smaller than the outer diameter D of the convex portion 16. However, since the absorbing member 10 is elastic, it is elastically deformed when the convex portion 16 is inserted, providing an insertion path along which the convex portion 16 is inserted.

After passing through the absorbing member 10, the projected end 16a of the convex portion 16 comes into contact with the second seal member 43. Located between the projected end 16a of the convex portion 16 and the second movable valve 42, the second seal member 43 provides a seal therebetween.

When the convex portion 16 is inserted into the concave portion 37, the absorbing member 10 is located between the inner circumferential wall 41 of the concave portion 37 and the outer circumferential surface 16b of the convex portion 16. When the second seal member 43 provides a seal between the projected end 16a of the convex portion 16 and the second movable valve 42, the absorbing member 10 is separate from the first and second liquid supply passages 17 and 38 in a liquid-tight manner.

In the first stage, the fixing valve 36 of the fuel supply tube 33 and the first movable valve 18 of the fuel cartridge 8 are not in contact with each other, and the fuel L is in the inner bag 13 and the hollow space S of the proximal portion 15.

When the projected end 16a of the convex portion 16, which is in contact with the second seal member 43, is inserted further into the fuel supply tube 33, the process of connecting the liquid supply joint 14 to the fuel supply tube 33 of the DMFC main body 9 enters into the second stage.

Figure 7:
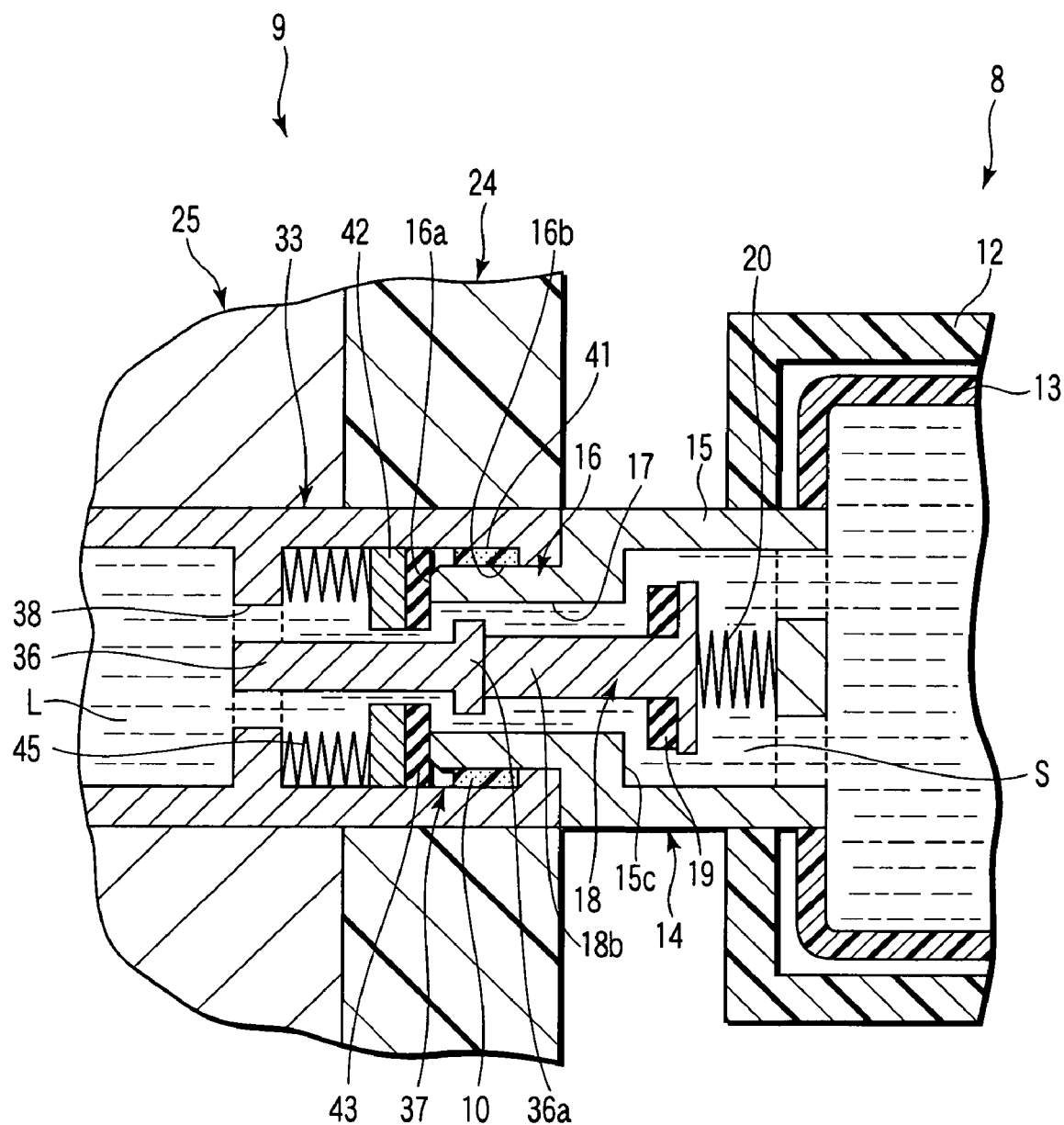
FIG. 7 is an exemplary sectional view showing how the convex and concave sections of FIG. 3 are when the convex section has been inserted into the concave section.

As shown in FIG. 7, when the convex portion 16 is inserted further into the fuel supply tube 33 from the state of the first stage, the second movable valve 42 moves inward of the DMFC main body 9 in accordance with the movement of the convex portion 16. When the second movable valve 42 moves inward, a gap is produced between the fixing valve 36 and the second seal member 43, and the first liquid supply passage 17 is connected to the second liquid supply passage 38. In this manner, the first and second liquid supply passages 17 and 38 communicate with each other.

On the other hand, the head portion 36a of the fixing valve 36 strikes against the distal end of the shaft portion 18b of the first movable valve 18, and moves the first movable valve 18 backward to a position inward of the fuel cartridge 8. When the first movable valve 18 moves back, a gap is created between the inner wall 15c of the proximal portion 15 and the first seal member 19. As a result, the fuel L contained in the hollow space S of the proximal portion 15 flows into the first liquid supply passage 17. Then, the fuel L flows from the first liquid supply passage 17 to the second liquid supply passage 38. In this manner, the fuel L flows between the first and second liquid supply passages 17 and 38. The fuel L supplied to the second liquid supply passage 38 is used by the DMFC main body 9, for power generation.

In the second stage as well, the absorbing member 10 is surrounded by the outer circumferential surface 16b of the convex portion 16 and the second seal member 43, and is kept away from the fuel L. In other words, the absorbing member 10 is covered with the outer circumferential surface 16b of the convex portion 16 and is separate from the first and second liquid supply passages 17 and 38 in a liquid-tight manner.

A description will now be given of the process in which the fuel cartridge 8 is removed from the DMFC main body 9.

The fuel cartridge 8 is removed from the holder 24 when most of the fuel L contained in the fuel cartridge 8 is used and the fuel cartridge 8 becomes almost empty. When the liquid supply joint 14 is pulled off the fuel supply tube 33, the head portion 36a of the fixing valve 36 leaves from the first movable valve 18. The first movable valve 18 comes into contact with the inner wall 15c of the proximal portion 15, with the first seal member 19 interposed. The first seal member 19 provides a seal between the hollow space S of the proximal portion 15 and the first liquid supply passage 17. In other words, the first movable valve 18 closes the first liquid supply passage 17. As a result, the fuel L is not supplied to the first liquid supply passage 17.

Next, the projected end 16a of the convex portion 16 leaves from the second movable valve 42. The second movable valve 42 comes into contact with the fixing valve 36, with the second seal member 43 interposed. The second seal member 43 provides a seal between the second liquid supply passage 38 and the opening 35a. In other words, the second movable valve 42 closes the second liquid supply passage 38.

As shown in FIG. 8, when the first and second movable valves 18 and 42 are restored to their the original state, the fuel L remaining in the first liquid supply passage 17 and the concave portion 37 is not allowed to flow anywhere. However, since the convex portion 16 is pulled out of the concave portion 37, the absorbing member 10, which has been covered with the outer circumferential surface 16b of the convex portion 16 until then, is exposed to the internal region of the concave portion 37.

The fuel L remaining in the first liquid supply passage 17 and the concave portion 37 is absorbed in the absorbing member 10. In other words, the fuel L that remains in the liquid supply joint 14 is wiped off by the absorbing member 10 when the fuel cartridge 8 is removed from the DMFC main body 9. It should be noted that the absorbing member 10 absorbs not only the liquid fuel L but also the evaporated or gaseous fuel L. Since the opening 10a of the absorbing member 10 is smaller than the outer diameter D of the convex portion 16, the absorbing member 10 is in tight contact with the outer circumferential surface 16b of the convex portion 16 when the fuel cartridge 8 is removed from the DMFC main body 9.

The fuel L in the liquid supply joint 14 is absorbed in the absorbing member 10, and the fuel L does not remain in the liquid supply joint 14. Therefore, even if the user touches the removed fuel cartridge 8, it is not likely that the user's hand touches the fuel L.

The absorbing member 10, in which the fuel L is absorbed, permits the absorbed fuel L to evaporate with time. Even where a new fuel cartridge 8 is attached to the DMFC main body 9, the absorbing member 10 can absorb the fuel L when that new fuel cartridge 8 is removed.

With the DMFC apparatus 1 of the above structure, it is possible to provide a leak preventing mechanism which prevents a fluid leak from a device and which protects the user from the absorbing member in which the fluid is absorbed. When the fuel cartridge 8 is removed from the DMFC main body 9, the fuel L remaining in the liquid supply joint 14 is absorbed in the absorbing member 10. Since the fuel L does not remain in the liquid supply joint 14, the fuel L does not leak from the fuel cartridge 8.

Since the absorbing member 10 is provided on the inner circumferential wall 41 of the concave portion 37, it is not likely that the user will touch the absorbing member 10, unless the user intentionally does so. In other words, it is not likely that the user will touch the absorbing member 10 in which the fuel L is absorbed.

In the DMFC apparatus 1 of the above embodiment, the second unit for which the absorbing member 10 is provided is not the fuel cartridge 8 but the DMFC main body 9. That is, the absorbing member 10 is not provided for the fuel cartridge 8 which the user is likely to touch, but for the DMFC main body 9 which is placed on a desk or the like.

Because of the bent portion 35, the surface of the absorbing member 10 which is exposed to the outside of the DMFC main body 9 is small in area. This further reduces the possibility that the user will touch the absorbing member 10. Where the absorbing member 10 is located more inside of the DMFC main body 9 than the bent portion 35 is, it is possible to further reduces the possibility that the user will touch the absorbing member 10.

When the convex portion 16 is inserted into the concave portion 37, the second seal member 43 is interposed between the projected end 16a of the convex portion 16 and the second movable valve 42 of the concave portion 37. With this structure, the absorbing member 10 is separate from the first and second liquid supply passages 17 and 38 in a liquid-tight manner. According to the DMFC apparatus 1 of the first embodiment, the absorbing member 10 can be reliably performs its absorbing function when the convex portion 16 is pulled off the concave portion 37.

Since the opening 10a of the absorbing member 10 is smaller than the outer size of the convex portion 16, the absorbing member 10 is in tight contact with the outer circumferential surface 16b of the convex portion 16. Because of this tight contact, the absorbing member 10 can wipe off the fuel L on the outer circumferential surface 16b of the convex portion 16. Of the structural components of the fuel cartridge 8 removed from the DMFC main body 9, the outer circumferential surface 16b of the convex portion 16 is one of the portions that the user is likely to touch. Since the fuel L is wiped off the outer circumferential surface 16b of the convex portion 16, the user is not endangered.

In general, an absorbing member absorbs the ambient fluid well when it recovers from its compressed state. It is therefore effective to design the opening 10a of the absorbing member 10 to be smaller than the outer size of the convex portion 16 and to compress the absorbing member 10 with the outer circumferential surface 16b of the convex portion 16. With this structure, the absorbing member 10 performs its function effectively when the convex portion 16 is pulled off the concave portion 37.

The projected end 16a of the convex portion 16 is chamfered, as described above. With this structure, the convex portion 16 can be smoothly inserted into the opening 10a of the absorbing member 10 even though the opening 10a is smaller than the outer size of the convex portion 16.

The absorbing member 10 permits the absorbed fuel L to evaporate with time. With this structure, the absorbing member 10 can be repeatedly used. Considering that the absorbing member 10 is provided on the inner circumferential wall 41 of the concave portion 37 and is therefore hard to replace with a new one, it is effective that the absorbing member 10 can be repeatedly used.

The second seal member 43 may be attached to the projected end 16a of the convex portion 16 instead of being attached to the second movable valve 42. In addition, the second seal member 43 may be omitted.

In the embodiment described above, the bottom wall of the concave portion 37 is formed as the second movable valve 42. If a valve mechanism capable of controlling the fluid flow in the first and second liquid supply passages 17 and 38 is provided, the bottom wall need not be the movable valve, and may be integral with the inner circumferential wall 41.

Figure 9:
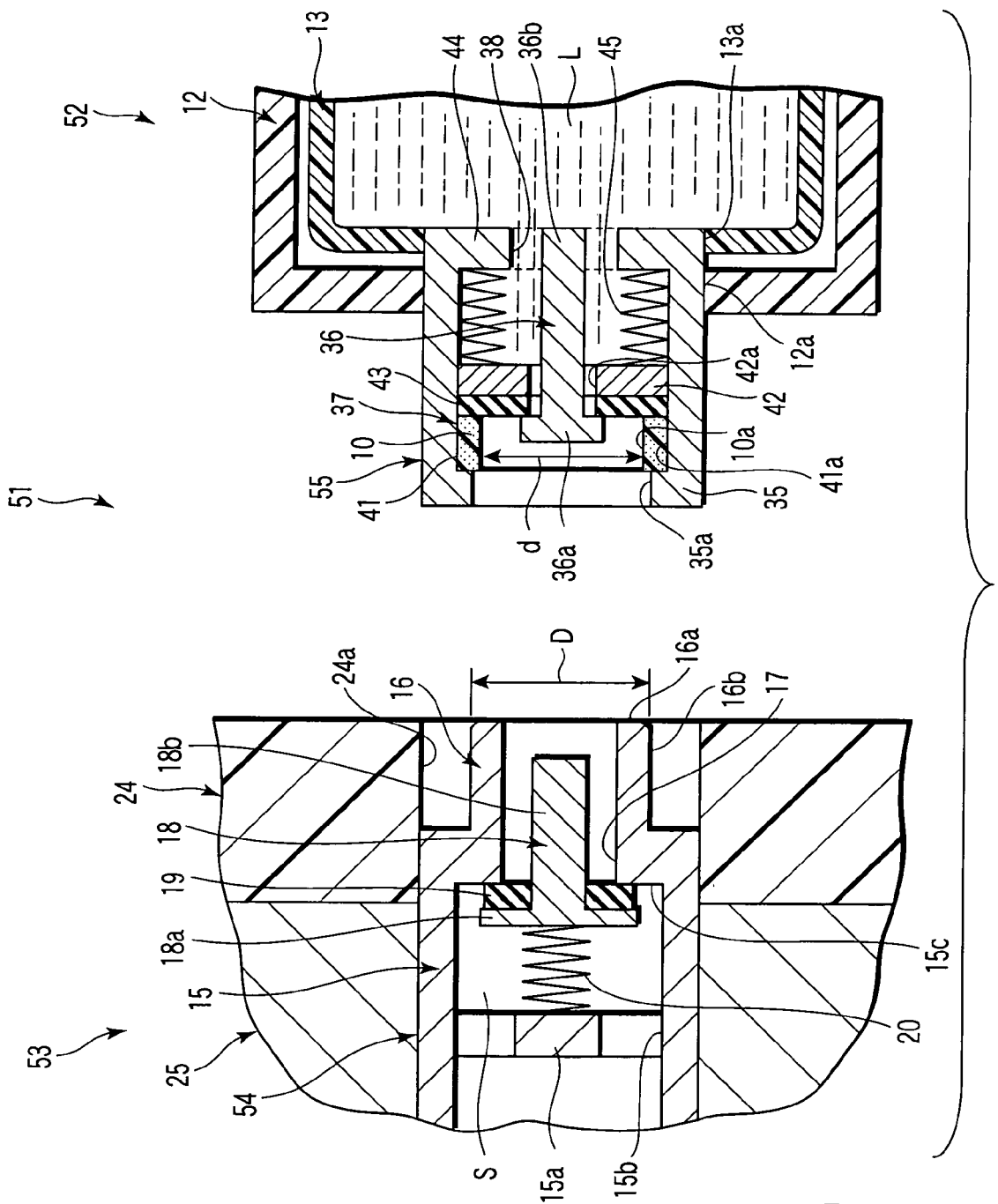
FIG. 9 is an exemplary sectional view of a DMFC apparatus according to the second embodiment of the present invention.

A DMFC apparatus 51, which is a leak preventing structure according to the second embodiment of the present invention, will be described with reference to FIG. 9. In FIG. 9, the same reference numerals as used in FIGS. 1-8 denote corresponding or similar structural elements, and a detailed description of such structural elements will be omitted herein.

The DMFC apparatus 51 includes a casing 6, and a fuel cartridge 52, a DMFC main body 53 and an absorbing member 10 are housed in the casing 6. The DMFC main body 53 is an example of the first unit. A mixing tank 31 is an example of a first casing. The mixing section 25 of the DMFC main body 53 includes a fuel supply tube 54.

The fuel supply tube 54 is an example of a first fluid supply portion. The fuel supply tube 54 is in the opening 24a of the holder 24 and is exposed to the outside of the DMFC main body 53. The fuel supply tube 54 includes a proximal end portion 15 and a convex portion 16. The convex portion 16 includes a first liquid supply passage 17. In the hollow space S of the proximal end portion of the fuel supply tube 54, a first movable valve 18, a first seal member 19 and a first spring 20 are provided.

The fuel cartridge 52 is an example of the second unit. A cartridge case 12 is an example of a second cartridge. The fuel cartridge 52 is provided with a liquid supply joint 55. The joint 55 is an example of a second fluid supply portion. The liquid supply joint 55 includes a bent portion 35, a fixing valve 36, a concave portion 37 and a second liquid supply passage 38. The concave portion 41 has an inner circumferential wall 41 on which an absorbing member 10 is provided.

The DMFC apparatus 51 of the above structure provides a leak preventing structure which not only prevents a fluid leak from a device but also protects a user from a fluid-containing absorbing member. To be more specific, the DMFC apparatus 51 is similar to the DMFC apparatus 1 of the first embodiment in that the absorbing member 10 is provided on the inner circumferential wall 41 of the concave portion 41. This structure prevents the fuel L from remaining in the liquid supply joint 55. Since the absorbing member 10 is provided on the inner circumferential wall 41 of the concave portion 37, it is not likely that the user will touch the absorbing member 10, unless the user intentionally does so.

The present invention is not limited to the DMFC apparatuses 1 and 51 of the first and second embodiments described above. That is, the present invention is applicable not only to DMFC apparatuses but also to fuel cells using other types of fuel. The present invention is applicable further to apparatuses other than fuel cells. As can be seen from this, the present invention is applicable to an apparatus of any size and any type as long as the apparatus includes a connection that enables the supply of a fluid.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A leak preventing structure comprising:
   a first unit including (i) a first casing, (ii) a convex portion provided for the first casing, and (iii) a first passage which is open in an end of the convex portion;
   a second unit including (i) a second casing, (ii) a concave portion which is provided for the second casing, the concave portion includes an inner circumferential wall and a bottom wall and into which the convex portion is to be inserted, and (iii) a second passage which is open in the bottom wall of the concave portion and which is connected to the first passage and permits a fluid to flow between the first and second passages, when the convex portion is inserted into the concave portion; and
   an absorbing member provided on the inner circumferential wall of the concave portion and interposed between the inner circumferential wall of the concave portion and an outer circumferential surface of the convex portion, the absorbing member, being an elastic member including an opening which is smaller than outer size of the convex portion and into which the convex portion is to be inserted, is configured to absorb the fluid when the convex portion is pulled out of the concave portion.

2. The leak preventing structure according to claim 1, wherein the first unit is a cartridge configured to supply the fluid to the second unit, and the second unit is a circulation device configured to circulate the fluid.

3. The leak preventing structure according to claim 1, further comprising a seal member which is to be interposed between the end of the convex portion and the bottom wall of the concave portion.

4. The leak preventing structure according to claim 1, wherein the absorbing member is covered with the outer circumferential surface of the convex portion and is separate from the first and second passages in a liquid-tight manner, when the fluid flows between the first and second passages.

5. The leak preventing structure according to claim 4, wherein the first unit includes a first movable valve capable of closing the first passage, the second unit includes a second movable valve capable of closing the second passage, and the absorbing member is exposed inside the concave portion after the first and second passages are closed.

6. The leak preventing structure according to claim 1, wherein the absorbing member comes into tight contact with the outer circumferential surface of the convex portion.

7. The leak preventing structure according to claim 6, wherein the absorbing member is covered with the outer circumferential surface of the convex portion and is separate from the first and second passages in a liquid-tight manner, when the fluid flows between the first and second passages.

8. The leak preventing structure according to claim 7, wherein the first unit includes a first movable valve capable of closing the first passage, the second unit includes a second movable valve capable of closing the second passage, and the absorbing member is exposed inside the concave portion after the first movable valve closes the first passage and the second movable valve closes the second passage.

9. The leak preventing structure according to claim 1, wherein the absorbing member permits the absorbed fluid to evaporate with time.

10. A leak preventing structure comprising:
    a first unit including (i) a first casing, (ii) a convex portion provided for the first casing, and (iii) a first passage which is open in an end of the convex portion;
    a second unit including (i) a second casing, (ii) a concave portion which is provided for the second casing, the concave portion includes an inner circumferential wall and a bottom wall and into which the convex portion is to be inserted, (iii) a second passage which is open in the bottom wall of the concave portion and which is connected to the first passage and permits a fluid to flow between the first and second passages, when the convex portion is inserted into the concave portion, and (iv), a bent portion which is bent inward of the concave portion from an end of the inner circumferential wall; and
    an absorbing member provided on the inner circumferential wall of the concave portion and interposed between the inner circumferential wall of the concave portion and an outer circumferential surface of the convex portion, the absorbing member is configured to absorb the fluid when the convex portion is pulled out of the concave portion and is located farther inside of the second unit than the bent portion.

11. The leak preventing structure according to claim 10, wherein the bent portion covers part of the absorbing member so as to prevent the part of the absorbing member from being exposed to the outside of the second unit.

12. A leak preventing structure comprising:
    a first unit provided with a first fluid supply portion, the first fluid supply portion includes a first passage and a first movable valve capable of closing the first passage;
    a second unit provided with a second fluid supply portion, the second fluid supply portion includes (i) an opening into which the first fluid supply portion is removably inserted so that a fluid flows between the first and second units, and (ii) a second passage which is to be connected to the first passage and a second movable valve capable of closing the second passage; and
    an absorbing member provided on an inner surface of the opening, the absorbing member being interposed between the inner surface of the opening and an outer surface of the first fluid supply portion and configured to absorb the fluid when the first fluid supply portion is pulled out of the opening, wherein
        the absorbing member is covered with the outer surface of the first fluid supply portion and is separate from the fluid which flows between the first and second units,
        the absorbing member is exposed inside the opening after the first movable valve closes the first passage and the second movable valve closes the second passage, and
        the absorbing member is an elastic member and includes an opening which is smaller than outer size of the first fluid supply portion and into which the first fluid supply portion is to be inserted.

13. The leak preventing structure according to claim 12, wherein the first unit is a cartridge configured to supply the fluid to the second unit, and the second unit is a circulation device configured to circulate the fluid.

14. The leak preventing structure according to claim 12, wherein the absorbing member comes into tight contact with the outer surface of the first fluid supply portion when the first fluid supply portion is pulled out of the second fluid supply portion.

* * * * *